INVENTOR.
PAUL A. ABRAMOSKA
BY
RICHEY, McNENNY & FARRINGTON
Donald W. Farrington
ATTORNEYS

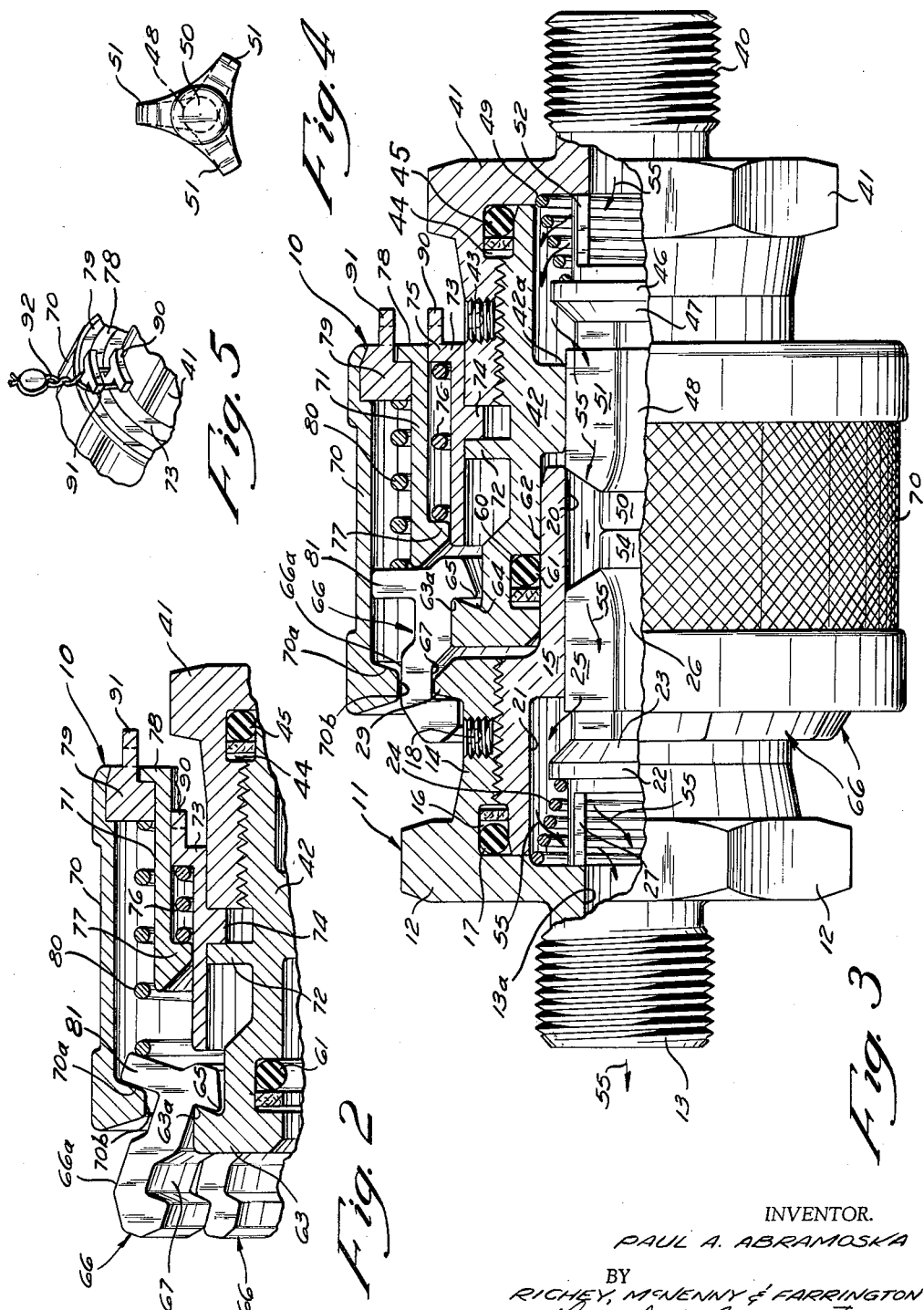

United States Patent Office 3,028,179
Patented Apr. 3, 1962

3,028,179
SELF-SEALING LOCKING COUPLING WITH MANIPULATOR AND PIVOTED LATCH MEANS
Paul A. Abramoska, Medina, Ohio, assignor to The Weatherhead Company, Cleveland, Ohio, a corporation of Ohio
Filed Dec. 29, 1958, Ser. No. 783,228
2 Claims. (Cl. 285—317)

The present invention relates to couplings for fluid lines and more particularly to a coupling which is quickly and easily effected by simple manual motions and wherein the coupling includes valves which open and close the fluid line as an incident to the coupling and uncoupling motions.

It is among the objects of my invention to provide a coupling whereby complementary sections of a conduit or hose may be readily connected in a fluid-tight manner or disconnected without relative rotary coupling movement between the sections.

It is a further object of my invention to provide a coupling according to the preceding object wherein one coupling unit is provided with hook-like latch segments which are mounted to swing radially outward over a flange on the other coupling unit and wherein the latch segments are maintained in a radially locked position over the flange by a sleeve sliding axially on the segments.

It is a further object of my invention to provide a coupling wherein an actuating sleeve at the exterior of one coupling unit may be pulled along the coupling unit axially thereof so as to sequentially unlock the coupling member, close the fluid lines and move the coupling members away from each other in one continuous manual motion.

It is a further object of my invention to provide a coupling according to the preceding object wherein the actuating sleeve may be wire-locked to the body of the coupling to guard against inadvertent disconnection of the coupling members.

Further objects and advantages relating to efficiency in operation, fluid-tight sealing and simplicity of construction will appear from the following description and the appended drawings wherein:

FIG. 2 is an elevation with parts in section illustrating an intermediate position of one of the coupling parts;

FIG. 3 is an elevation with parts in section showing the coupling in coupled relation and establishing fluid flow through the coupling;

FIG. 4 is an end view of a valve member having radial webs which is part of the coupling of my invention; and FIG. 5 is a perspective view of safety lock means to prevent inadvertent disconnecting of the coupling.

Figure 1:
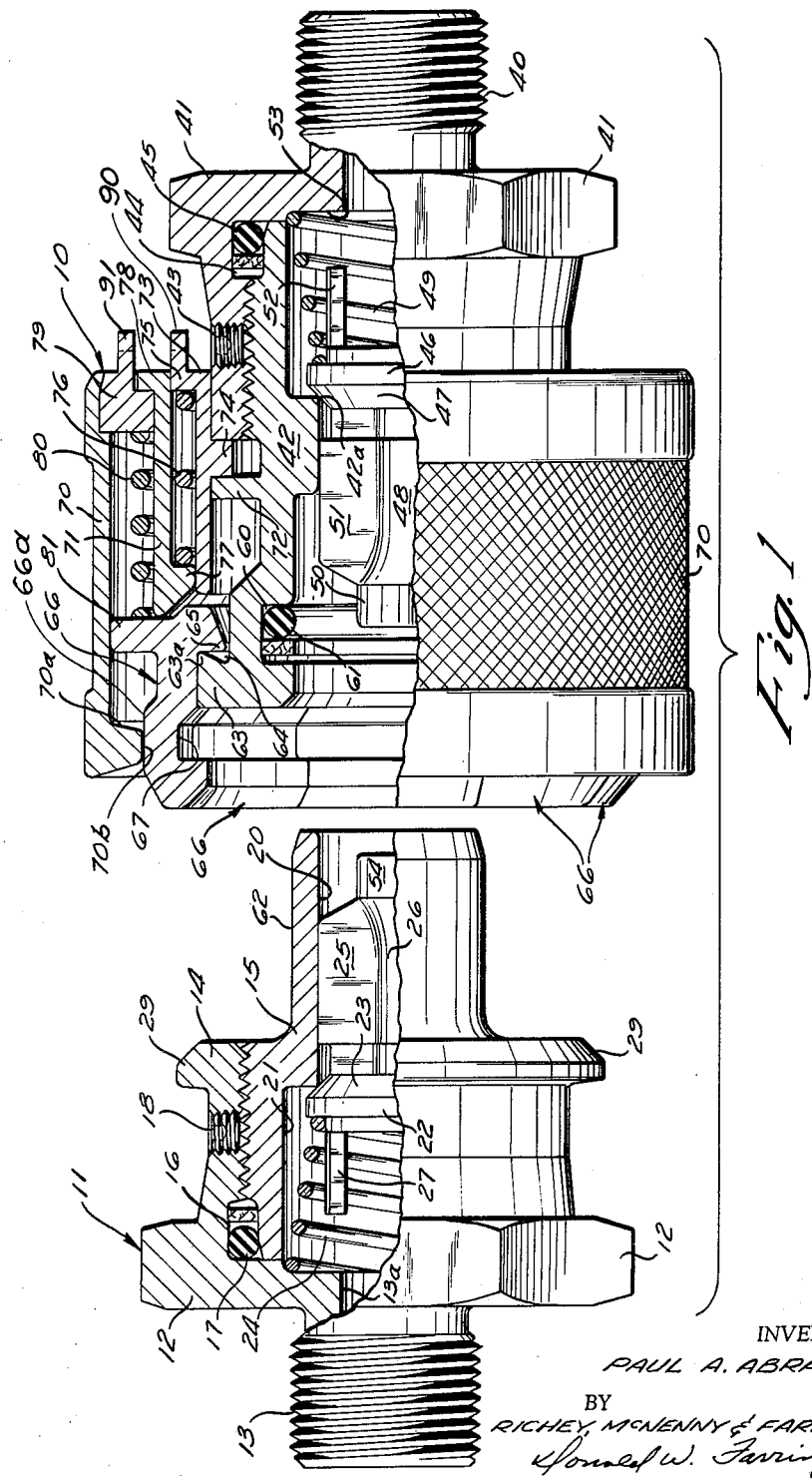
FIG. 1 is an elevation of the cooperating coupling members with parts in section showing the members in uncoupled relation.

The coupling made according to my invention includes a sleeve lock unit indicated in its entirety as at 10 and a unit 11 which includes a part to be inserted within the assembly 10. The left-hand unit 11, as indicated in FIG. 1, is provided with a body 12 externally threaded as at 13 to facilitate connection of the unit 11 with a hose, pipe, bulkhead or other fixture. The body 12 includes the tubular section 14 which is internally threaded to receive a tubular element 15. The portions 14 and 15 are each provided with a groove forming the seal chamber 16 having an O-ring seal 17 therein to insure against loss of fluid along the inter-threaded connection between the members 14 and 15. After the threaded connection has been completed a locking screw 18 is inserted.

The member 15 includes bore sections of two different diameters, namely, the bore 20 and the bore 21. At the juncture between the bores 20 and 21 an annular valve seat or port is formed to receive the valve head 22 having the chamfered face thereon indicated at 23. The valve is normally biased to a closed position by valve spring 24 and the valve is guided in its reciprocating movement by web portions 25 on the valve stem 26. The opening movement of the valve is limited by the spaced legs 27 which engage the radial wall at the interior of the member 12 when the valve is fully opened. The unit 11 is provided with an annular locking flange 29 which is arranged to cooperate with a locking device carried by the unit 10.

The coupling unit 10, illustrated at the right-hand side of FIG. 1, is preferably connected to a hose threaded onto the portion 40 of the unit 10. Thus the left-hand unit 11 may be mounted on a bulkhead or other relatively fixed structure and the unit 10 may be moved bodily toward and away from the unit 11 during the coupling and uncoupling action. It will be understood that the unit 10 is connected to a flexible hose or other flexible conduit that will permit the relative axial movement of units 10 and 11. It will also be understood that both couplings may be connected to flexible conduits. The unit 10 includes a body member 41 and a tubular member 42 threaded thereinto and locked by lock screw 43. The interior of the member 41 and the end of the member 42 are each provided with grooves forming a seal chamber 44 and an O-ring gasket or similar seal 45 is arranged within the seal chamber 44. The seal 45 functions like the seal 17 of the left-hand unit 11 to prevent the escape of fluid along the inter-threaded connection of the two members. The right-hand coupling section also includes a spring-pressed valve assembly similar to that described above in connection with the left-hand unit 11 of the coupling. A valve head 46 having a valve face 47 and a stem 48 is biased by spring 49 to a closed position on the edge of the port 42a.

The valve in the right-hand unit 10 is provided with a valve head 50 on the outer end of the stem 48 and three spaced diverging vanes or webs 51 extend radially from the stem 48 to guide the valve member in its reciprocating movement within the coupling body. The open position of the valve is limited by the abutment of the spaced legs 52 against the end wall 53 of the coupling member 41. The left-hand coupling unit 11 is similarly provided with a valve head 54 with a flat end face adapted to abut the flat end face of the head member 50 on the right-hand coupling unit 10. When the units 10 and 11 are coupled, as illustrated in FIG. 3, both valve units are fully opened and fluid flow is established through the coupling as indicated by the arrows 55. The fluid enters the right-hand coupling member 10 and passes through and around the abutment legs 52, between the convolutions of the spring 49, thence around the valve member 46 between the webs 51 and thence over the abutting valve heads 50 and 54. Thereafter the fluid follows the path of the arrows 55 through the left-hand coupling member 11 wherein it is moved between the webs 25 over the valve 22, thence through the convolutions of the spring 24 and outward through the bore 13a.

It will be understood that the opening and closing of the valves is accomplished by the disconnecting and connecting action of the coupling members 10 and 11.

The tubular section 42 of the right-hand coupling unit 10 is provided with a re-entrant groove 60 at the interior thereof to form a housing for an O-ring seal 61 arranged to form a fluid-tight seal with the exterior cylindrical surface 62 on the left-hand valve member 11. The exterior portion of the member 42 is provided with an annular flange 63 having a re-entrant annular groove 64 to receive the inner ends 65 of latch members 66. A plurality of segmental latch members are provided and each of the segmental latch members 66 includes a re-entrant channel section or hook 67 adapted to receive and hold the flange 29 on the left-hand coupling unit 11. Each of the latch members 66 form a segment of a circular structure completely surrounding the flange 29 and each of the latch members 66 are individually tiltable to open position as shown in FIG. 2.

The movement of the latch members 66 to open and closed position is controlled by a sliding sleeve assembly including sleeves 70 and 71 which surround the coupling member 42. The tubular member 42 within unit 10 is provided with a radially extending flange 72 at its exterior. A fixed sleeve 73 surrounds the flange 72 and is provided with an inwardly extending shoulder 74 which is held against the flange 72 by the threaded member 41 at its forward end face.

When the member 41 is drawn tightly onto the member 42 and the set screw 43 locked in place, the shoulder 75 on the sleeve 73 serves as an abutment for a coil spring 76. The sliding sleeve 71 is provided with a shoulder 77 bearing against the other end of the spring 76 so as to normally urge the sleeve 71 to the left as viewed in FIG. 3. The sleeve 71 is also provided with a radially extending shoulder 78 to serve as an abutment for the member 79 fixed to the interior of the sleeve 70.

A coil spring 80 is interposed between the ring 79 on the sleeve 70 and the radially extending portions 81 of the latch members 66. With the parts of the coupling 10 in the position shown in FIG. 1 and in FIG. 3, it will be noted that the spring 76 biases the sleeve 71 to the left and thus biases the latching members 66 inwardly about the fulcrum point 63a. As shown in FIG. 3, the spring 76 biases each latch 66 into holding engagement on the flange 29 of unit 11. The sleeve 70 may be manually moved to the right as viewed in FIG. 3 and such movement will, in turn, move the sleeve 71 to the right by reason of the inter-engagement of the shoulders 78—79. This manual movement of sleeve 70 is effected while unit 11 is held against movement.

As the sleeve 71 moves to the right the spring 76 is compressed, whereas the spring 80 is expanded inasmuch as the axial distance between the portion 81 of the latch 66 and the end portion 79 of the sleeve is being increased. This relative contraction of spring 76 and expansion of the spring 80 is illustrated in FIG. 2 wherein the shoulder 70a at the interior of the sleeve 70 is brought to bear against the latch member 81 and thus tilt the same outwardly and free the right-hand coupling unit 10 for bodily movement away from the coupling unit 11.

As this uncoupling action is continued and the coupling unit 10 is pulled axially away from the unit 11, the pressure on the valve head members 50—54 is progressively reduced and the valve springs 24 and 49 are then effective to close the valve members 22 and 46, respectively. When the manually moved sleeve 70 is released, the springs 76 and 80 will restore the latch member 66 to the position shown in FIG. 1.

The spring 80 continuously biases the sleeve 70 to the right along the sleeve 71 to the limit of its movement as determined by the lug 78 at the end of sleeve 71. The spring 80 thus biases the sleeve 70 to the position shown in FIGS. 1 and 2 wherein the forward end of the sleeve 70 having the surface 70b locks the tilting dog member 66 is locked position. If the spring 80 were omitted from the assembly, the sleeve 70 could slide to the left and thus release the locking engagement with respect to the tilting dogs 66.

Each of the latch members 66, when moved to closed position, presents an exterior cylindrical surface 66a coaxial with the axis of the coupling. The outer sleeve member 70 is provided with a cylindrical surface 70b which is concentric with the surface 66a and thus locks the latch member 66 against outward tilting movement when the parts are in the position illustrated in FIG. 3. Accordingly it will be understood that the locking action of the latch members 66 is effected by the sleeve 70. The mating surfaces of the locking members 66 and the flange 29 are preferably sloped with respect to each other as shown to exert a wedge or cam action effective to pull the coupling members into sealing engagement. The locking is positive and will not be released by vibration or other than a manual pulling of the sleeve 70 longitudinally of the coupling.

To insure against inadvertent manual uncoupling, the coupling unit 10 is provided with a wire lock device as illustrated in FIG. 5. The fixed sleeve 73 is provided at its exposed end face with an integrally formed tab 90. The member 79 at the rear end face of the sleeve 70 is similarly provided with a tab 91. Each of the tabs 90 and 91 have a greater peripheral extent than the intermediate portion of the tab. The shape provided results in aligned cross heads so that a wire lock 92 may be applied as illustrated. The wire lock includes a seal and prevents inadvertent or unauthorized manual movement of the sleeve 70 with respect to the fixed sleeve 73.

Although I have shown and described one form of my coupling in considerable detail, it will be understood that numerous modifications may be made therein without departing from the scope of the invention as defined in the following claims.

What is claimed is:

1. A coupling member comprising a tubular body, said body having an axial bore therethrough, an annular shoulder at the interior of said tubular body intermediate the ends thereof to provide a socket at one side of the shoulder, a fixed sleeve surrounding said tubular body, said sleeve having an axial extent less than the axial extent of said tubular body, said sleeve being spaced axially from the socket end of said body, said tubular body having an annular flange extending radially outward adjacent the open end of the socket portion of the body, said flange being spaced from the end of said fixed sleeve to provide an annular recess therebetween, a plurality of segmental members surrounding said latch flange, each of said latch members comprising a hooked portion projecting beyond the open end of said socket, a mid-portion bearing against the outer periphery of said flange, the inner surface of said mid-portion being in the form of a portion of a surface of revolution having a radius corresponding to the radius of the peripheral edge of said flange, an inwardly extending ear portion disposed in said annular recess between the fixed sleeve and said flange on the body, and an outwardly extending ear portion, a coil spring surrounding said fixed sleeve, a movable sleeve surrounding said coil spring, said movable sleeve having an inwardly turned flange bearing against one end of said spring whereby said movable sleeve is biased toward said latch members urging said latch members inwardly with the mid-portions thereof against said flange on the body, a manual sleeve surrounding said movable sleeve, said manual sleeve surrounding said outwardly extending ear portion on said latch members and having a ring arranged to bear against the outer surface of the mid-portions of said latch members to prevent said latch members from swinging radially outward in one axial position of said manual sleeve said manual sleeve bing slidable axially of the coupling to bring said ring on said manual sleeve into engagement with the outwardly projecting ears on said latch members for causing said latch members to swing radially outward to released position.

2. A coupling comprising an annular body, a plurality of latch fingers positioned in succession circumferentially of said body and each extending lengthwise of said body, each of said latch fingers having a transversely inwardly extending latching lip and having a transversely outwardly extending flange, each of said latch fingers being pivotally supported on said body for movement pivotally between a latching position in which said lips are disposed inwardly toward the axis of the body and a release position in which said lips are retracted outwardly away from the axis of the body, an inner sleeve slidable lengthwise of the body behind said latch fingers, a first spring biasing said inner sleeve in one direction along the body against said latch fingers to hold the latter in their latching positions, an outer sleeve surrounding said latch fingers and slidable with respect thereto lengthwise of the body, said outer sleeve having an inwardly extending portion which closely overlies the outside of said latch fingers to retain the latter in their latching positions in one position of the outer sleeve lengthwise of the body, said outer sleeve being retractable back from said one position in the opposite direction along the body to engage said flanges on the latch fingers and pivot the latter to their release positions, a coupling member spaced behind said latch fingers and coupling said outer and inner sleeves together for movement in unison so that the inner sleeve is retracted away from the latch fingers during said retraction of the outer sleeve, and a second spring engaged under compression between said coupling member and said flanges on the latch fingers, said second spring exerting on the latch fingers a biasing force tending to hold the latter in their latching positions, which biasing force is a maximum in said one position of the outer sleeve and decreases progressively as the outer sleeve is retracted in said opposite direction along the body back from said one position, said second spring urging the inner and outer sleeves in said opposite direction along the body with a spring force which is a maximum in said one position of the outer sleeve and which decreases progressively as the outer sleeve is retracted in said opposite direction along the body back from said one position, said first spring exerting a greater biasing force on the sleeves than said second spring in all positions of the sleeves along the body and normally positioning said outer sleeve in said one position and said inner sleeve against said latch fingers so that both sleeves hold said latch fingers in their latching positions.

References Cited in the file of this patent
UNITED STATES PATENTS

| | | |
|---|---|---|
| 1,857,528 | Cantell | May 10, 1932 |
| 2,356,901 | Wackman | Aug. 29, 1944 |
| 2,770,256 | Krapp | Nov. 13, 1956 |
| 2,777,716 | Gray | Jan. 15, 1957 |
| 2,850,297 | Clark | Sept. 2, 1958 |
| 2,888,278 | Torres | May 26, 1959 |

FOREIGN PATENTS

| | | |
|---|---|---|
| 847,163 | France | June 26, 1939 |
| 552,435 | Great Britain | Apr. 7, 1943 |
| 577,184 | Great Britain | June 15, 1943 |